(12) United States Patent
Scherer, III et al.

(10) Patent No.: US 10,318,736 B2
(45) Date of Patent: Jun. 11, 2019

(54) VALIDATING OPERATING FIRMWARE OF A PERIPERHAL DEVICE

(71) Applicant: Hewlett Packard Enterprise Development LP, Houston, TX (US)

(72) Inventors: William N. Scherer, III, Houston, TX (US); Shiva R. Dasari, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 181 days.

(21) Appl. No.: 15/338,723

(22) Filed: Oct. 31, 2016

(65) Prior Publication Data

US 2018/0121656 A1 May 3, 2018

(51) Int. Cl.
*G06F 15/177* (2006.01)
*G06F 9/00* (2006.01)
*G06F 21/57* (2013.01)
*G06F 11/14* (2006.01)
G06F 8/654 (2018.01)

(52) U.S. Cl.
CPC ............ *G06F 21/572* (2013.01); *G06F 11/14* (2013.01); *G06F 8/654* (2018.02)

(58) Field of Classification Search
CPC ............................ G06F 21/572; G06F 9/4411
See application file for complete search history.

(56) References Cited

U.S. PATENT DOCUMENTS

2011/0099361 A1 * 4/2011 Shah ..................... H04W 12/10
713/2
2017/0097828 A1 * 4/2017 Kim ....................... G06F 9/4406

* cited by examiner

*Primary Examiner* — Xuxing Chen
(74) *Attorney, Agent, or Firm* — Hewlett Packard Enterprise Patent Department

(57) ABSTRACT

Various examples described herein provide for firmware verification on a peripheral device that can couple to a computing device. Before operating firmware is executed on the peripheral device, boot firmware can execute on the peripheral device and cause the peripheral device to generate a hash of the operating firmware. The peripheral device can transmit the hash to a validator external to the peripheral device, such as a management processor. The peripheral device can receive, from the validator, a validation decision based on the transmitted hash. In response to the validation decision indicating invalidity of the operating firmware, the peripheral device can execute recovery firmware to cause the peripheral device to retrieve replacement firmware. Depending on the example, the retrieved replacement firmware may replace the operating firmware or the operating firmware may be updated based on the retrieved replacement firmware.

20 Claims, 8 Drawing Sheets

VALIDATING OPERATING FIRMWARE OF A PERIPERHAL DEVICE

BACKGROUND

Computing devices, such as servers, include mechanisms by which firmware of the computing device can be authenticated as genuine before it is executed on the computing device. If the firmware cannot be authenticated, a backup copy, such as a last-known trusted firmware, would be used instead.

BRIEF DESCRIPTION OF THE DRAWINGS

Certain examples are described in the following detailed description with reference to the following drawings.

DETAILED DESCRIPTION

Figure 1:
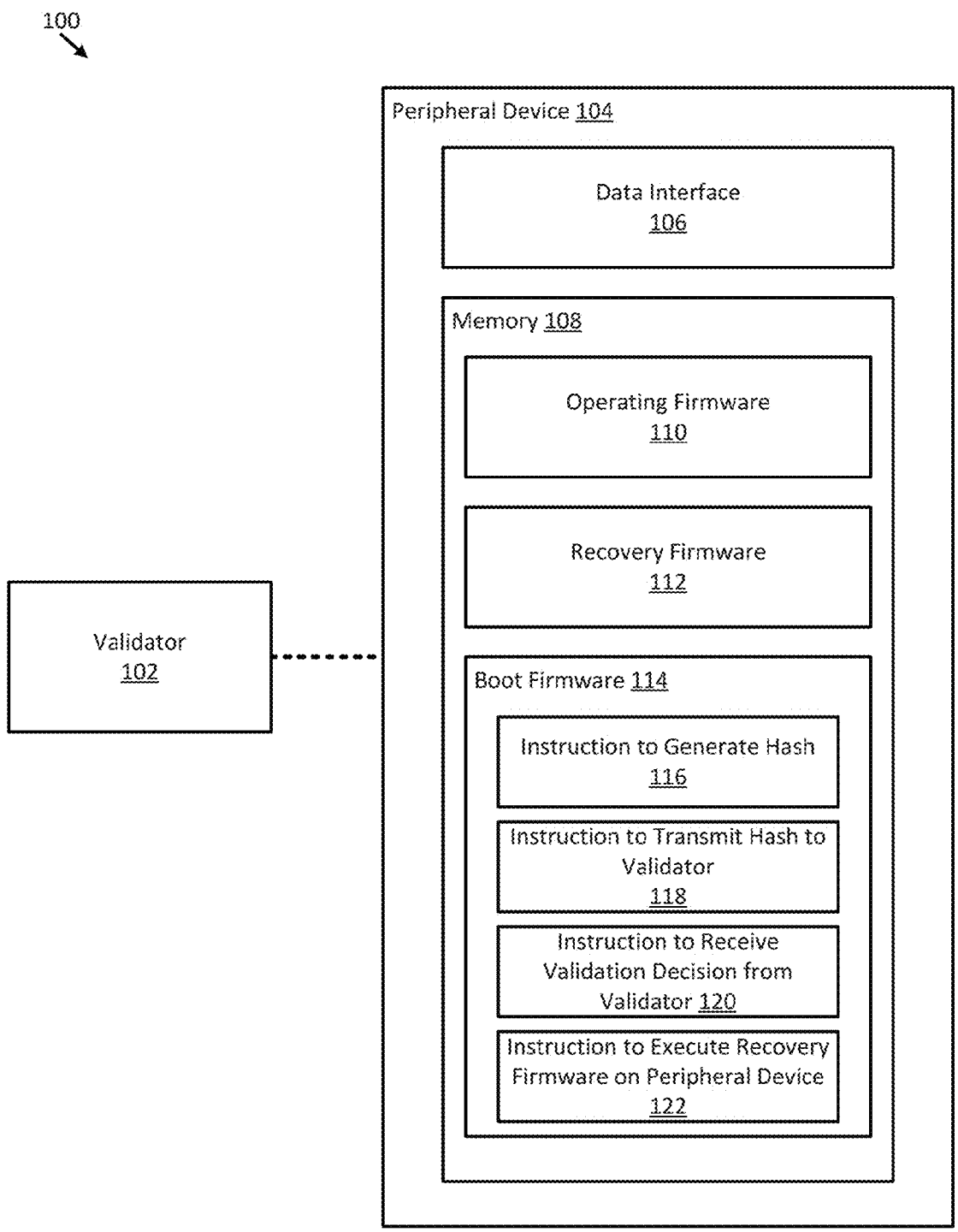
FIG. 1 is a block diagram illustrating an example peripheral device according to the present disclosure.

Traditionally, a capability of a computing device can be modified or enhanced by coupling to the computing device a set of peripheral devices. It is common for a peripheral device to include firmware that facilitates various operations on the peripheral device including, without limitation, boot-up, initialization, shutdown, reset, and normal operation. As noted herein, a computing device can include a mechanism that permits the computing device to use (e.g., execute) a full-size and trusted backup copy of firmware when the original copy firmware (e.g., primary copy of operating firmware) fails to authenticate as genuine. While this approach works well for the computing device itself, such may not be the case on peripheral cards (e.g., network interface controllers [NICs] or a storage adapter), where there may be a lack of sufficient storage space (e.g., in non-volatile flash memory [NVM]) to store a full-size and trusted backup copy of firmware. Additionally, increasing the amount of data storage on a peripheral card can lead to higher unit costs and additional competitive disadvantages.

Various examples described herein provide firmware verification on a peripheral device. Various examples also provide for firmware restoration or rollback on the peripheral device without requiring the peripheral device to maintain a full-size and trusted backup copy of the firmware. According to an example, before operating firmware is executed on the peripheral device, boot firmware (e.g., boot code instructions) can execute on the peripheral device and cause the peripheral device to generate a hash of the operating firmware. The peripheral device can transmit the hash to a validator external to the peripheral device, such as a management processor operating as a validator. For some examples, the validator is an entity trusted by the peripheral device, and may be an entity local to a computing device coupled to (e.g., including) the peripheral device, or may be another computing device remote with respect to the computing device. The peripheral device can receive, from the validator, a validation decision based on the transmitted hash. In response to the validation decision indicating invalidity of the operating firmware, the peripheral device can execute recovery firmware to cause the peripheral device to retrieve replacement firmware. For some examples, the recovery firmware has a smaller data size than a full-size, trusted backup copy of the operating firmware, thus making the recovery firmware an attractive alternative to storing the backup copy on the peripheral device for firmware recovery or rollback purposes. Depending on the example, the retrieved replacement firmware may replace the operating firmware or the operating firmware may be updated based on the retrieved replacement firmware. Additionally, depending on the example, the recovery firmware may cause replacement of the operating firmware with the retrieved replacement firmware and may cause the operating firmware to be updated based on the retrieved recovery firmware.

The recovery firmware can comprise skeletal firmware, and may have just enough capability to retrieve the replacement firmware from a data source external to the peripheral device, and to restore (e.g., replace or update) the operating firmware with the retrieved replacement firmware. Various examples described herein augment the recovery firmware with an external audit process in which the validator checks a hash (e.g., cryptographic hash) of the operating firmware against a set of accepted hashes (e.g., white list of hashes) for trusted versions of the operation firmware. Additionally, various examples described herein can enable signature-free firmware validation, can preclude firmware rollback against individual versions of valid firmware with exploitable defects, and can permit forced replacement of versions of firmware deemed insecure.

As used herein, a computing device can comprise a desktop, laptop, workstation, server (e.g., rack-mount server), or other device that operates by a processor, which may include an enclosure to house a peripheral device coupled to the computing device. As used herein, a management processor can include a hardware processor that is dedicated to management of the computing device, and that can execute in a separate or isolated manner from the main processor of the computing system. An example of a management processor can include a baseboard management controller (BMC), which is a specialized microcontroller embedded on a motherboard of a computing device such as a server. A BMC can support the Intelligent Platform Management Interface (IPMI) architecture, which defines a set of common interfaces to computer hardware and firmware that system administrators can use to monitor health and manage a computing device. A BMC can manage the interface between system management software and hardware of the computing device. A BMC of a computing device can provide remote management access to the computing device, and may provide such remote management access over an out-of-band communication channel, which isolates management communication from communication of an operating system (OS) running on the computing device. In some instances, the BMC may enable lights-out management of the computing device, which provides remote management access (e.g., system console access) to the computing device regardless of whether the computing device is powered on, whether a primary network subsystem hardware is functioning, or whether an OS is operating or even installed.

As used herein, a peripheral device can include a modular computing device component of a computing device (e.g., laptop, desktop, server, or smartphone), which can couple to the computing device through a data interface of the computing device. A peripheral device may couple to a computing device internally (e.g., to a data bus slot or interface within the housing of the computing device) or externally, such as through an external input/output (I/O) interface (e.g., Universal Serial Bus [USB]). Once coupled to a computing device, the peripheral device can be considered installed with respect to the computing device and a management processor of the computing device can communicate with the peripheral device as disclosed herein. Example peripheral devices can include, without limitation, network interface cards (NICs), user input devices, storage devices, storage adapters (e.g., host bus adapters [HBAs] or redundant array of inexpensive disks [RAID] controllers), display adapters, sensors, and USB devices (e.g., USB bus extender or USB memory device).

Additionally, as used herein, modules and other components of various examples may comprise, in whole or in part, hardware (e.g., electronic circuitry), or a combination of hardware and programming (e.g., machine-readable instructions, such as firmware), to implement functionalities described herein. For instance, a module may comprise a combination of machine-readable instructions, stored on at least one non-transitory machine-readable storage medium, and at least one processing resource (e.g., controller) to execute those instructions. The machine-readable instructions may comprise computer-readable instructions executable by a processor to perform a set of functions in accordance with various examples described herein. In another instance, a module may comprise electronic circuitry to perform a set of functions in accordance with various examples described herein.

The following provides a detailed description of examples illustrated by FIGS. 1-8.

FIG. 1 is a block diagram illustrating an example peripheral device 104 according to the present disclosure. FIG. 1 illustrates a computing environment 100 (e.g., a computing device) in which a validator 102 is coupled to the peripheral device 104. Depending on the example, the peripheral device 104 may couple to the validator 102 over a wired data path, a wireless data path, or a combination of both. For instance, the peripheral device 104 may couple to the validator 102 over a data bus (e.g., Peripheral Component Interconnect [PCI], Peripheral Component Interconnect Express [PCIe], or System Management Bus [SM Bus]) included in the computing environment 100. In another instance, each of the peripheral device 104 and the validator 102 are included by separate computing devices and the peripheral device 104 couples to the validator 102 over a network connection coupling the separate computing devices. In various examples, the components or the arrangement of components in the validator 102 or the peripheral device 104 may differ from what is depicted in FIG. 1.

For some examples, the validator 102 comprises a management processor included in a computing device coupled to the peripheral device 104. For some examples, the validator 102.

For some examples, the validator 102 comprises a management processor included in a computing device remote with respect to the computing device coupled to the peripheral device 104. For some examples, the validator 102 comprises a central processing unit (CPU) executing a software application that causes the CPU to function as a validator as described herein.

In FIG. 1, the peripheral device 104 includes a data interface 106 and a memory 108. For some examples, the data interface 106 facilitates communication with the validator 102, which as shown in FIG. 1, is external to the peripheral device 104. The data interface 106 may comprise, for instance, a data bus interface (e.g., PCI interface). For various examples, data communications between the validator 102 and the peripheral device 104 is facilitated over a secure communication channel (e.g., encrypted network connection or encrypted data bus).

For some examples, the memory 108 comprises a non-volatile memory, such a flash memory. The memory 108 can represent a set of memory devices utilized by the peripheral device 104 for persistent and non-persistent data storage. For instance, the peripheral device 104 may include volatile memory (not shown) upon which firmware is loaded (from the non-volatile memory) before it is executed by the peripheral device 104. The peripheral device 104 may also include a processing core (not shown) that facilitates execution of some or all of firmware on the peripheral device 104.

In FIG. 1, the memory 108 includes operating firmware 110, recovery firmware 112, boot firmware 114. For some examples, the boot firmware 114 is executed by the peripheral device 104 before the operating firmware 110 is executed by the peripheral device 104. Additionally, for some examples, the operating firmware 110 has a larger data size than the recovery firmware 112. Once executed, the operating firmware 110 may enable use of the peripheral device 104 (e.g., enable access of its functionality) by a computing device coupled to the peripheral device 104. For instance, the operating firmware 110 may comprise an operating system (OS) for the peripheral device 104. For some examples, the boot firmware 114 occupies less data space on the memory 108 than the operating firmware 110. For some examples, boot hardware (not shown) is included by the peripheral device 104 and used in place of the boot firmware 114. For such examples, the boot hardware may replace the boot firmware 114. Additionally, for some examples, recovery hardware (not shown) is included by the peripheral device 104 and used in place of the recovery firmware 112. For such examples, the recovery hardware may replace the recovery firmware 112.

For some examples, the recovery firmware 112 occupies less data space on the memory 108 than the operating firmware 110. As described herein, this can permit the recovery firmware 112 to fit within the memory 108 with the operating firmware 110, and obviate the need for the memory 108 to be larger to accommodate a trusted, backup copy of operating firmware 110.

According to various examples, when executed by the peripheral device 104, the recovery firmware 112 causes the peripheral device to retrieve, from a data source (not shown) external to the peripheral device 104, replacement firmware (not shown). The recovery firmware 112 may comprise a minimal set of functionality to retrieve a replacement firmware from the data source. For some examples, it would not be necessary for the recovery firmware 112 to be capable of performing any of the peripheral device 104's normal functions. Depending on the example, once the replacement firmware is retrieved from the data source, at least one of the boot firmware 114 or the recovery firmware 112 can cause the peripheral device 104 to install the replacement firmware, which may replace the operating firmware 110 with the retrieved replacement firmware or may update (e.g., patch or restore) the operating firmware 110 based on the retrieved replacement firmware. The recovery firmware 112 may utilize or comprise at least a portion of a software update manager (SUM). For authentication purposes, the recovery firmware 112 may be signed and verifiable by the peripheral device 104 before it is executed. The recovery firmware 112 may have functionality to cause the peripheral device 104 to identify itself to a computing device to which it is coupled, and may have functionality to cause the peripheral device 104 to communicate it status (e.g., of lacking verifiable operating firmware). The recovery firmware 112 may have functionality to validate the replacement firmware retrieved by the recovery firmware 112 before the retrieved replacement firmware is installed on the peripheral device 104.

The data source may be one trusted by the peripheral device 104, and the recovery firmware 112 may cause the peripheral device 104 to retrieve recovery firmware from the data source over a secure communication channel. The data source may be included (e.g., in a component) within a computing device coupled to the peripheral device 104 or may be included by a remote computing device different from the computing device coupled to the peripheral device 104. For instance, the data source may comprise a remote computing device maintained by the manufacturer of the peripheral device 104 or the computing device coupled to the peripheral device 104. The data source may be included by the validator 102, which may be included by a computing device coupled to the peripheral device 104 or by a remote computing device different from the computing device coupled to the peripheral device 104.

The boot firmware 114 may be executed by the peripheral device 104 at power-up of the peripheral device 104. For instance, the peripheral device 104 may be coupled to a computing device that is initially powered-down and the peripheral device may power-up when the computing device is powered-up. In another instance, the peripheral device 104 may power-up when coupled to a computing device that is already powered-up (e.g., hot plug-in). The boot firmware 114 may be included (e.g., installed) on the peripheral device 104 by its manufacturer and may be immutable. For instance, the boot firmware 114 may be included on a portion of the memory 108 that can be rendered read-only (e.g., a mechanism to lock storage sectors of the memory 108) once the boot firmware 114 is stored on the portion. In another instance, the boot firmware 114 may be installed (e.g., burned onto) a read only memory (ROM) that is included by the memory 108. By making the boot firmware 114 immutable, the manufacturer can ensure that a trusted copy of the boot firmware 114 is included by the peripheral device 104, and obviate the need for the peripheral device 104 to authenticate the boot firmware 114 before its execution.

In FIG. 1, the boot firmware 114 includes an instruction 116 to generate a hash, an instruction 118 to transmit a hash to the validator 102, an instruction 120 to receive a validation decision from the validator 102, and an instruction 122 to execute the recovery firmware 112 on the peripheral device 104. In particular, the instruction 116 can cause the peripheral device 104 to generate a hash of the operating firmware. The hash may be generated based on some or all of operating firmware (i.e., data comprising the operating firmware). The instruction 118 may cause the peripheral device 104 to transmit the generated hash to the validator 102 through the data interface 106. For instance, the validator 102 may comprise a management processor and the peripheral device 104 may communicate with the management processor through the data interface over an internal data bus.

The instruction 120 may cause the peripheral device 104 to receive, from the validator 102, a validation decision based on the transmitted hash. The validation decision may comprise an indication regarding the invalidity of the operating firmware 110. The validation decision may be generated by the validator 102 based on the hash transmitted to it by the peripheral device 104. The peripheral device 104 may analyze the validation decision upon its receipt from the validator 102. The instruction 122 may cause the peripheral device 104 to execute the recovery firmware 112 in response to the validation decision indicating invalidity of the operating firmware. For various examples described herein, the validation decision comprises a "go" response to indicate that the operating firmware is valid, and a "no go" response to indicate that the operating firmware is invalid. A "go" response may signal to the peripheral device 104 that the peripheral device 104 should trust the operating firmware 110 currently installed and proceed with its execution. In contrast, a "no go" response may signal to the peripheral device 104 that the peripheral device 104 should not trust the operating firmware 110 and should respond accordingly.

As described herein, the recovery firmware 112 may retrieve the replacement firmware from a data source external to the peripheral device 104. Depending on the example, location of the data source may be included within the recovery firmware 112 or, alternatively, may be provided by the validation decision provided by the validator 102. Upon installation of the replacement firmware on the peripheral device 104, the peripheral device 104 can be reset for the replaced/updated operating firmware to be executed by the boot firmware.

Figure 2:
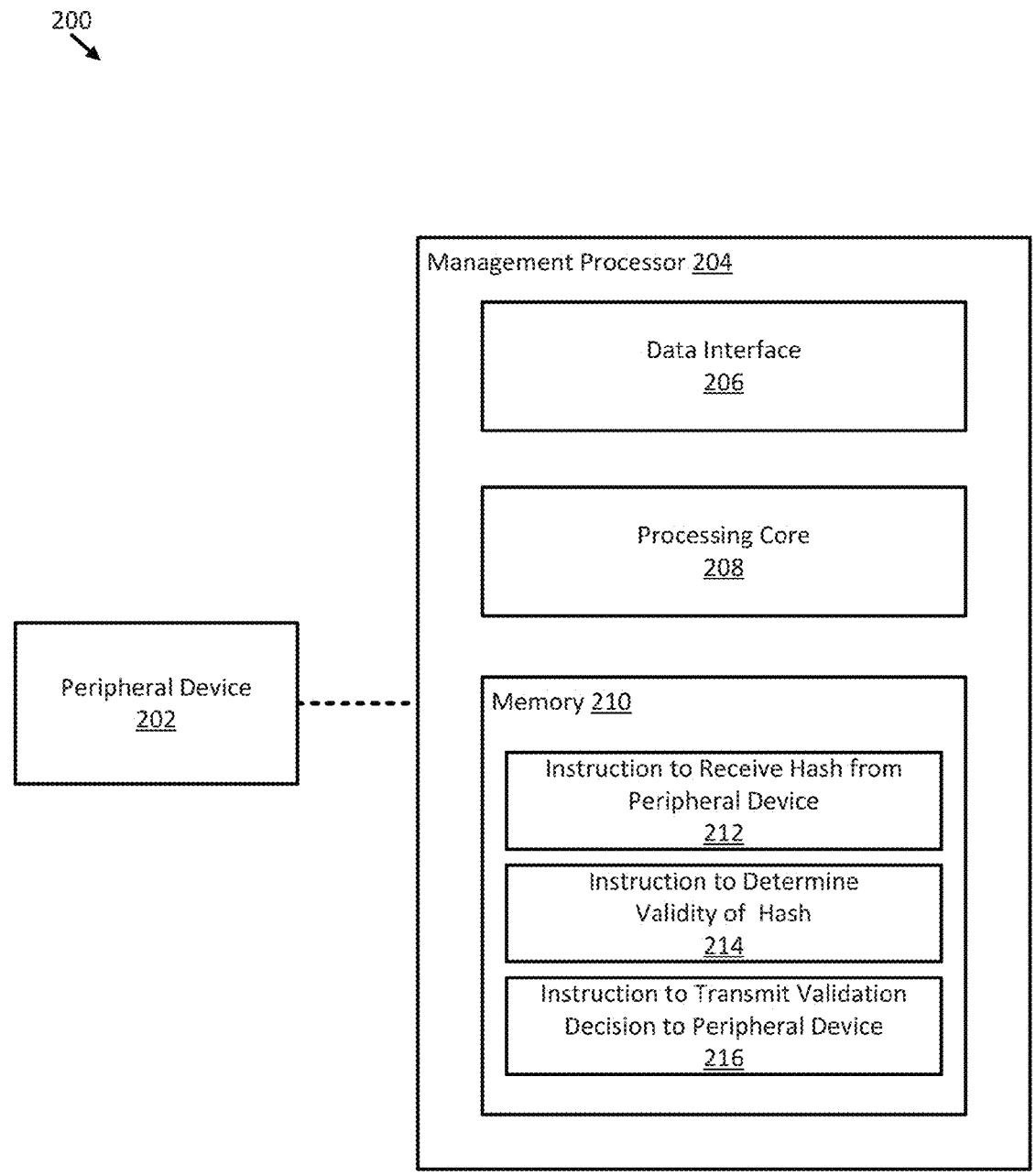
FIGS. 2 and 3 are block diagrams illustrating example management processors according to the present disclosure.

FIG. 2 is a block diagram illustrating an example management processor 204 according to the present disclosure. FIG. 2 illustrates a computing environment 200 (e.g., a computing device) in which a peripheral device 202 is coupled to the management processor 204. For some examples, the management processor 204 operates as a validator for operating firmware on the peripheral device 202. Depending on the example, the peripheral device 202 may couple to the management processor 204 over a wired data path, a wireless data path, or a combination of both. For instance, the peripheral device 202 may couple to the management processor 204 over a data bus (e.g., Peripheral Component Interconnect [PCI], Peripheral Component Interconnect Express [PCIe], or System Management Bus [SMBus]) included in the computing environment 200. In another instance, each of the peripheral device 202 and the management processor 204 are included by separate computing devices and the peripheral device 202 couples to the management processor 204 over a network connection coupling the separate computing devices. In various examples, the components or the arrangement of components in the peripheral device 202 or the management processor 204 may differ from what is depicted in FIG. 2.

In FIG. 2, the management processor 204 includes a data interface 206, a processing core 208, and a memory 210. For some examples, the data interface 206 facilitates communication with the peripheral device 202, which as shown in FIG. 2, is external to the management processor 204. The data interface 206 may comprise, for instance, a data bus interface (e.g., PCI interface). For various examples, data communications between the peripheral device 202 and the management processor 204 is facilitated over a secure communication channel (e.g., encrypted network connection or encrypted data bus).

For some examples, the processing core 208 facilitates execution of instructions that cause the management processor 204 to operate as validator for the peripheral device 202. For some examples, the memory 210 comprises a non-volatile memory, such a flash memory. The memory 210 can represent a set of memory devices utilized by the management processor 204 for persistent and non-persistent data storage. For instance, the management processor 204 may include volatile memory (not shown) upon which instructions are loaded (from the non-volatile memory) before they are executed by the peripheral device 104.

In FIG. 2, the memory 210 includes an instruction 212 to receive a hash from the peripheral device 202, an instruction 214 to determine validity of the hash, and an instruction 216 to transmit a validation decision to the peripheral device 202. In particular, the instruction 212 may cause the management processor 204 to receive, from the peripheral device 202, a hash associated with operating firmware on the peripheral device 202. As described herein, the hash can be generated based on some or all of the operating firmware on the peripheral device 202. The instruction 214 may cause the management processor 204 to determine the validity of the hashed received by way of instruction 212.

According to various examples, the management processor 204 determines the validity of the received hash by comparing the received hash against a set of accepted hashes. This set of accepted hashes may be managed as a whitelist of hashes associated with versions of operating firmware that can be trusted for execution by a peripheral device (e.g., the peripheral device 202). The set of accepted hashes may be stored on some form of database on the management processor 204 (e.g., on the memory 210). Additionally, the set of accepted hashes can comprise a subset of hashes associated with a particular make or model of peripheral devices. For instance, the set of accepted hashes may be associated with a particular make or model of a network interface controller (NIC), while a different set of accepted hashes may be associated with another make or model of a NIC. For some examples, where the management processor 204 cannot match the received hash with at least one hash included in the set of accepted hashes, the associated operating firmware is deemed invalid (e.g., not to be trusted) and the management processor 204 transmits a validation decision to the peripheral device 202 indicating the invalidity of the associated operating firmware. Where the management processor 204 can match the received hash with at least one of hash included in the set of accepted hashes, the associated operating firmware may be deemed valid and the management processor 204 may transmit a validation decision to the peripheral device 202 indicating the validity of the associated operating firmware. Validation of the received hash may be facilitated in other ways by some examples.

Figure 3:
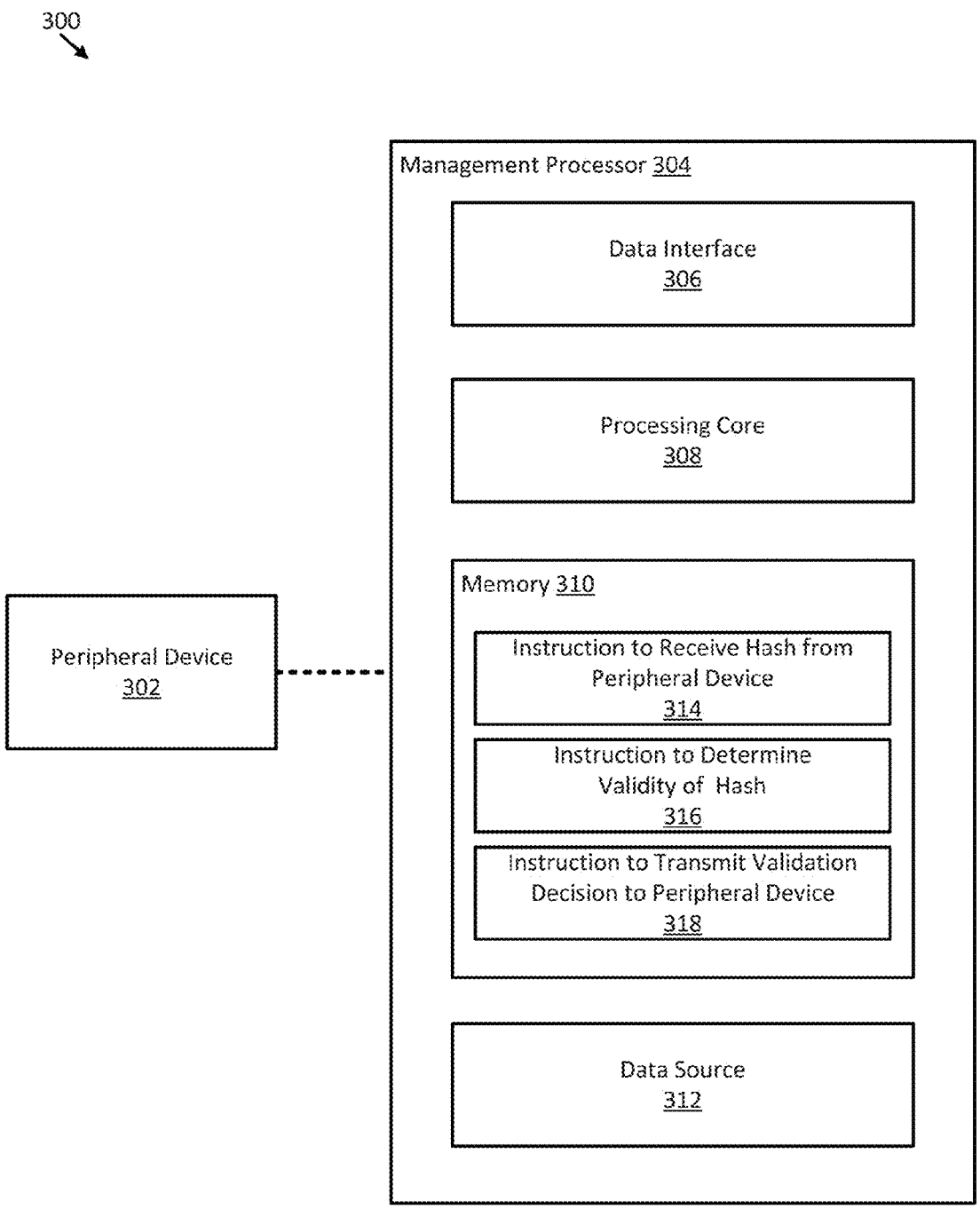

FIG. 3 is a block diagram illustrating an example management processor 304 according to the present disclosure. FIG. 3 illustrates a computing environment 300 (e.g., a computing device) in which a peripheral device 302 is coupled to the management processor 304. For some examples, the management processor 304 operates as a validator for operating firmware on the peripheral device 302. Depending on the example, the peripheral device 302 may couple to the management processor 304 over a wired data path, a wireless data path, or a combination of both. For instance, the peripheral device 302 may couple to the management processor 304 over a data bus (e.g., Peripheral Component Interconnect [PCI], Peripheral Component Interconnect Express [PCIe], or System Management Bus [SMBus]) included in the computing environment 300. In another instance, each of the peripheral device 302 and the management processor 304 are included by separate computing devices and the peripheral device 302 couples to the management processor 304 over a network connection coupling the separate computing devices. In various examples, the components or the arrangement of components in the peripheral device 302 or the management processor 304 may differ from what is depicted in FIG. 3.

In FIG. 3, the management processor 304 includes a data interface 306, a processing core 308, a memory 310, and a data source 312. For some examples, the data interface 306, the processing core 308, the memory 310, and the data source 312 are respectively similar to data interface 206, the processing core 208, and the memory 210 of the management processor 204 described above with respect to FIG. 2. Unlike the management processor 204 illustrated in FIG. 2, the management processor 304 includes the data source 312, which can provide the peripheral device 302 with replacement firmware when requested from the peripheral device 302 as described herein.

In FIG. 3, the memory 310 includes an instruction 314 to receive a hash from the peripheral device 302, an instruction 316 to determine a validity of the hash, and an instruction 318 to transmit a validation decision to the peripheral device 302. For some examples, the instructions 314 through 318 are respectively similar to the instructions 212 through 216.

Figure 4:
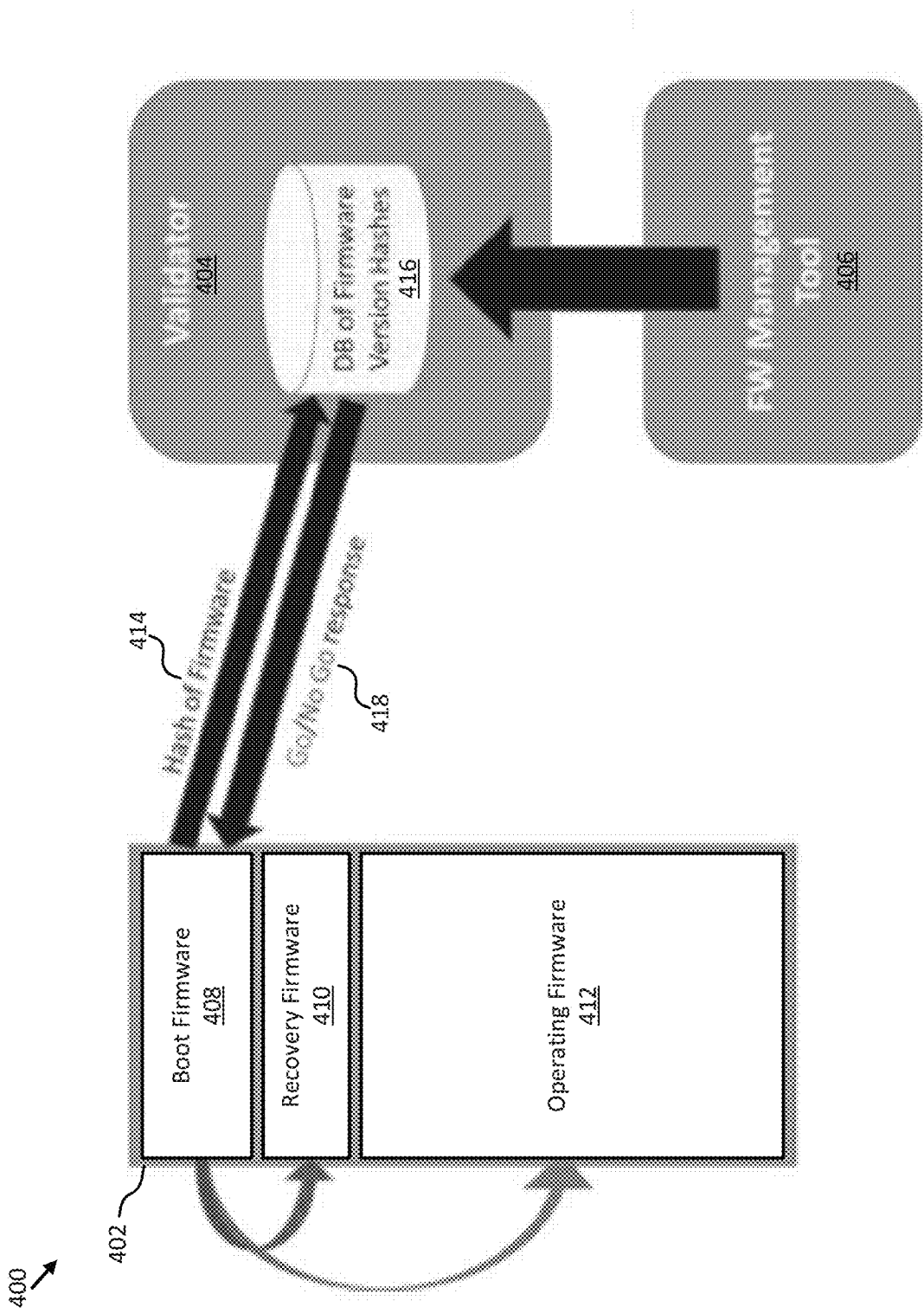
FIG. 4 is block diagram illustrating operation of an example peripheral device and an example validator according to the present disclosure.

FIG. 4 is block diagram illustrating operation of an example peripheral device 402 and an example validator 404 according to the present disclosure. FIG. 4 illustrates a computing environment 400 (e.g., a computing device) in which a peripheral device 402 communicates with a validator 404, and a firmware (FW) management tool 406 communicates with the validator 404. Depending on the example, communication between the peripheral device 402, the validator 404, and the FW management tool 406 may be facilitated over a wired data path, a wireless data path, or a combination of both. In various examples, the components or the arrangement of components in the peripheral device 402, the validator 404, or the FW management tool 406 may differ from what is depicted in FIG. 4.

In FIG. 4, the peripheral device 402 includes boot firmware 408, recovery firmware 410, and operating firmware 412. The validator 404 includes a database of firmware version hashes 416, which can represent a stored set of accepted hashes for versions of operating firmware. For some examples, the peripheral device 402 is similar to the peripheral device 104. Additionally, for some examples, the validator 404 comprises the management processor 304.

For some examples, the boot firmware 408 is executed on the peripheral device 402 before either the recovery firmware 410 or the operating firmware 412 is executed on the peripheral device 402. During execution, the boot firmware 408 can cause the peripheral device 402 to generate a hash of the operating firmware 412, which may be generated based on some or all of the operating firmware 412. As illustrated by data transmission 414, the peripheral device 402 can subsequently transmit the generated hash to the validator 404. As described herein, communication between the peripheral device 402 and the validator 404 may occur over a secure communication channel.

For some examples, the validator 404 determines the validity of the hash received via the data transmission 414. Additionally, for some examples, the validator 404 determines the validity of the received hash by comparing it against a set of accepted hashes stored on the database 416. Depending on the example, the database 416 may store a set of accepted hashes associated with versions of operating firmware to be trusted for the peripheral device 402. According to some examples, if the received hash is not found within the set of accepted hashes, the received hash is deemed invalid. Alternatively, if the received hash is found within the set of accepted hashes, the received hash can be deemed valid.

For some examples, the validator 404 transmits to the peripheral device 402 a communication 418 including a "go" response if the hash is determined to be valid by the validator, and otherwise including a "no go" response if the hash is determined to be invalid by the validator 404. As described herein, the peripheral device 402 can interpret a "go" response as indicating that the operating firmware 412 is valid (e.g., trustworthy) and that the execution of the operating firmware 412 by the peripheral device 402 should go ahead and proceed. The peripheral device 402 can interpret a "no go" response as indicating that the operating firmware 412 is invalid (e.g., potentially un-trustworthy) and the execution of the operating firmware 412 should not go ahead and proceed. In response to a "no go" response, the peripheral device 402 can also interpret a "no go" response as a signal to execute the recovery firmware 410. As described herein, the recovery firmware 410 can facilitate the retrieval of replacement firmware from a data source (not shown), and utilize the retrieved replacement firmware to replace or update the operating firmware 412 currently installed on the peripheral device 402.

The set of accepted hashes stored on the database 416 may be managed and updated via the FW management tool 406. Depending on the example, the FW management tool 406 is part of a data center management software application or a server management software application. For instance, the FW management tool 406 may include HEWLETT PACKARD ENTERPRISE ONEVIEW or Software Update Management. The FW management tool 406 may include an interface, such as a graphical user interface (GUI) or a command-line interface (CLI), through which a user (e.g., administrative user) can manage and update (e.g., add, remove, or modify) the set of accepted hashes stored on the database 416.

Figure 5:
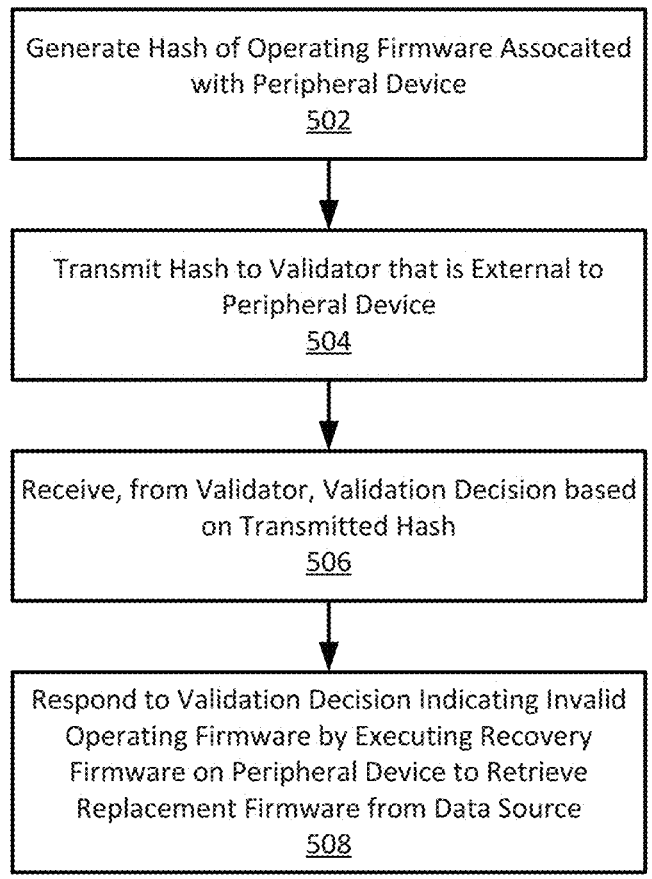
FIGS. 5 through 8 are flow diagrams illustrating example methods for validating firmware on a peripheral device according to the present disclosure.

FIG. 5 is a flow diagram illustrating an example method 500 for validating firmware on a peripheral device according to the present disclosure. In particular, the method 500 may be performed by a peripheral device, such as the peripheral device 104, which may be included by a computing device (e.g., server). Depending on the example, the method 500 may be implemented in the form of executable instructions stored on a machine-readable medium (e.g., firmware) or in the form of electronic circuitry. In FIG. 5, the method 500 can begin at block 502, with a peripheral device generating a hash of operating firmware associated with the peripheral device. The hash may be generated using a cryptographic hash function, and may be generated based on some or all of the operating firmware.

The method 500 may continue with block 504, with the peripheral device transmitting the hash generated at block 502 to a validator external to the peripheral device. As described herein, the validator may be included by the same computing device coupled to the peripheral device, or the validator may be included by a second computing device that is remote with respect to a first computing device coupled to the peripheral device. In the later instance, the peripheral device may transmit the hash to the validator over a network connection between the first and second computing devices. As also described herein, the validator may comprise a management processor, such as the management processor 204 described above with respect to FIG. 2, which may be included by the same computing device that is coupled to the peripheral device.

The method 500 may continue with block 506, with the peripheral device receive a validation decision from the validator, where the validation decision is based on the hash the peripheral device transmitted to the validator at block 504. As described herein, the validator receiving the hash may generate the validation decision based on the hash, and the validation decision may indicate to the peripheral device whether the operating firmware is valid and, therefore, to be trusted by the peripheral device. As also described herein, the validator may determine whether the operating system is valid based on whether the hash received by the validator is included in a set of accepted hashes known by the validator (e.g., a white list of hashes). For instance, where the validator determines that the hash received by the validator from the peripheral device is not included in a set of accepted hashes, the validator would determine the operating firmware to be invalid, and would generate a validation decision indicating as such.

The method 500 may continue with block 508, with the peripheral device executing recovery firmware on the peripheral device in response to the validation decision, received by the peripheral device at block 506, indicating that the operating firmware is invalid. As described herein, when executed on the peripheral device, the recovery firmware can cause the peripheral device to retrieve replacement firmware from a data source.

Figure 6:
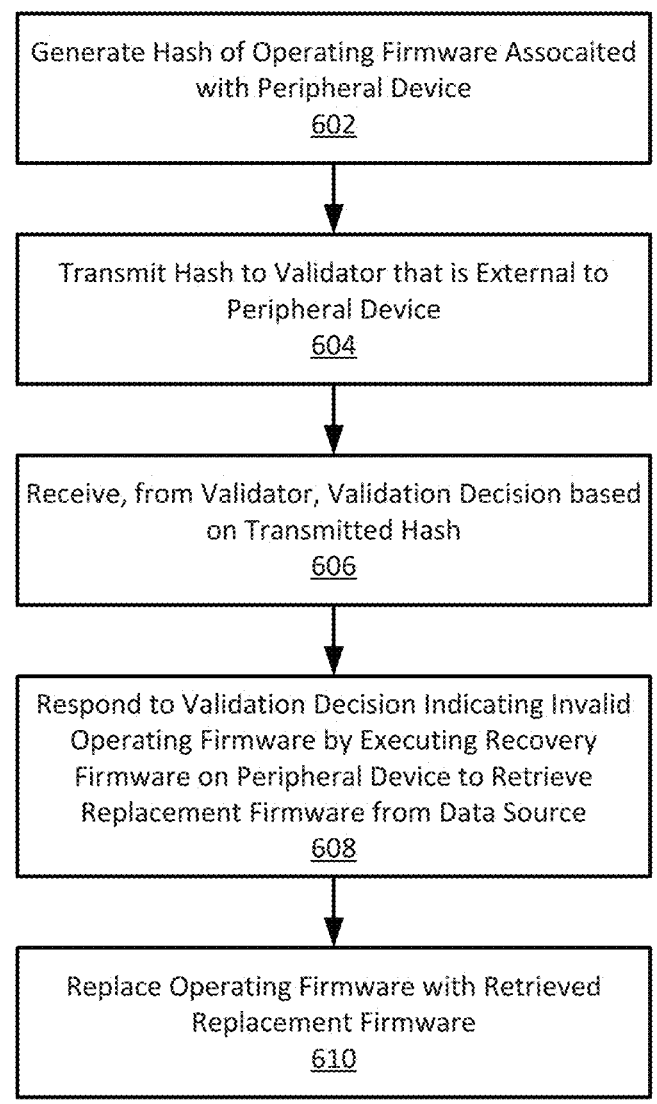

FIG. 6 is a flow diagram illustrating an example method 600 for validating firmware on a peripheral device according to the present disclosure. Similar to the method 500 described with respect to FIG. 5, the method 600 may performed by a peripheral device, such as the peripheral device 104, which may be included by a computing device (e.g., server). Depending on the example, the method 600 may be implemented in the form of executable instructions stored on a machine-readable medium (e.g., firmware) or in the form of electronic circuitry.

In FIG. 6, the method 600 may begin at block 602 and continue through block 604 through 608. For some examples, blocks 602, 604, 606, and 608 are similar to blocks 502, 504, 506, and 508 of the method 500 described above with respect to FIG. 5.

Subsequent to block 608, the method 600 may continue to block 610, with the peripheral device replacing the operating firmware with the replacement firmware retrieved by the peripheral device at block 608. Replacing the operating firmware with the replacement firmware may comprise the replacement firmware being installed over an existing installation of the operating firmware on memory of the peripheral device. In comparison to operating firmware determined to be untrustworthy by the validator, replacement firmware retrieved from a data source may be considered trusted firmware. Additionally, the replacement firmware may be an older or newer version of firmware in comparison to the operating firmware installed on memory of the peripheral device.

Figure 7:
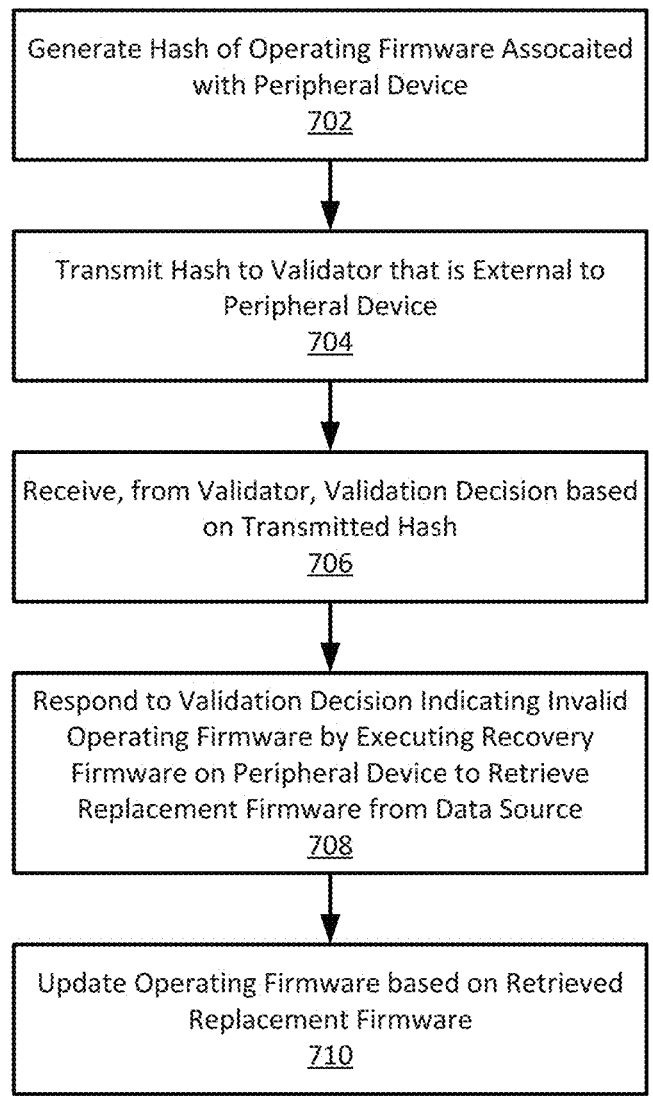

FIG. 7 is a flow diagram illustrating an example method 700 for validating firmware on a peripheral device according to the present disclosure. Similar to the method 500 described with respect to FIG. 5, the method 700 may performed by a peripheral device, such as the peripheral device 104, which may be included by a computing device (e.g., server). Depending on the example, the method 700 may be implemented in the form of executable instructions stored on a machine-readable medium (e.g., firmware) or in the form of electronic circuitry.

In FIG. 7, the method 700 may begin at block 702 and continue through block 704 through 708. For some examples, blocks 702, 704, 706, and 708 are similar to blocks 502, 504, 506, and 508 of the method 500 described above with respect to FIG. 5.

Subsequent to block 708, the method 700 may continue to block 710, with the peripheral device updating the operating firmware based on the replacement firmware retrieved by the peripheral device at block 708. Updating the operating firmware with the replacement firmware may comprise some or all of the operating firmware installed on the peripheral device being restored based on data based on data from the replacement firmware.

Figure 8:
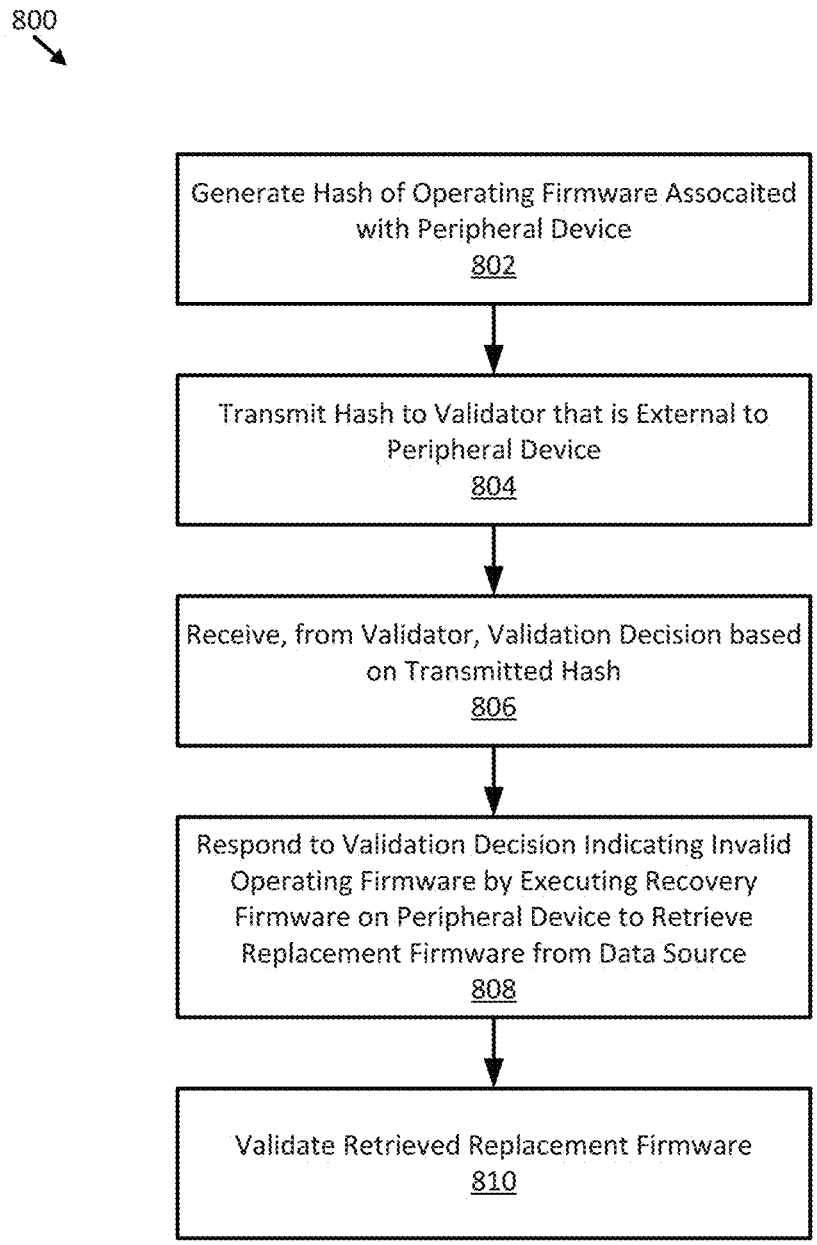

FIG. 8 is a flow diagram illustrating an example method 800 for validating firmware on a peripheral device according to the present disclosure. Similar to the method 500 described with respect to FIG. 5, the method 800 may performed by a peripheral device, such as the peripheral device 104, which may be included by a computing device (e.g., server). Depending on the example, the method 800 may be implemented in the form of executable instructions stored on a machine-readable medium (e.g., firmware) or in the form of electronic circuitry.

In FIG. 8, the method 800 may begin at block 802 and continue through block 804 through 808. For some examples, blocks 802, 804, 806, and 808 are similar to blocks 502, 504, 506, and 508 of the method 500 described above with respect to FIG. 5.

Subsequent to block 808, the method 800 may continue to block 810, with the peripheral device validating the replacement firmware retrieved by the peripheral device at block 808. For some examples, execution of the retrieved replacement firmware on the peripheral device is conditioned on successful validation of the retrieved replacement firmware by the peripheral device. Depending on the example, the retrieved replacement firmware may be validated based on a signature included by the retrieved replacement firmware. Accordingly, if the retrieved replacement firmware is unsigned or includes an invalid signature, it can be prevented from being executed on the peripheral device. The validation of the retrieved replacement firmware prior to its execution may for instance permit retrieval of the replacement firmware from an unverified data source by the recovery firmware at block 808.

In the foregoing description, numerous details are set forth to provide an understanding of the subject matter disclosed herein. However, various examples may be practiced without some or all of these details. Some examples may include modifications and variations from the details discussed above. It is intended that the appended claims cover such modifications and variations.

The invention claimed is:

1. A peripheral device, comprising:
a data interface to communicate with a validator external to the peripheral device; and
a memory including:
operating firmware;
recovery firmware to cause the peripheral device to retrieve, from a data source external to the peripheral device, replacement firmware for the operating firmware; and
boot firmware executed by the peripheral device before the operating firmware is executed by the peripheral device, the boot firmware to cause the peripheral device to:
generate a hash of the operating firmware;
transmit the hash to the validator through the data interface;
receive, from the validator, a validation decision based on the transmitted hash; and
in response to the validation decision indicating invalidity of the operating firmware, execute the recovery firmware to cause the peripheral device to retrieve the replacement firmware.

2. The peripheral device of claim 1, wherein the recovery firmware occupies less storage space on the memory than the operating firmware.

3. The peripheral device of claim 1, wherein at least one of the boot firmware or the recovery firmware causes the peripheral device to replace the operating firmware with the replacement firmware.

4. The peripheral device of claim 1, wherein at least one of the boot firmware or the recovery firmware causes the peripheral device to update the operating firmware based on the replacement firmware.

5. The peripheral device of claim 1, wherein the validator comprises a management processor.

6. The peripheral device of claim 5, wherein the peripheral device and the management processor are included by a computing device, and the peripheral device communicates with the management processor through the data interface over an internal data bus.

7. The peripheral device of claim 1, wherein the validator comprises the data source.

8. The peripheral device of claim 1, wherein the peripheral device is included by a local computing device, and the validator comprises a remote computing device.

9. The peripheral device of claim 1, wherein the boot firmware is immutable.

10. A management processor, comprising:
a data interface to communicate with a peripheral device external to the management processor;
a processing core; and
a memory including executable instructions, which when executed by the processing core causes the management processor to:
receive, from the peripheral device, a hash associated with operating firmware of the peripheral device;
determine validity of the received hash; and
transmit, to the peripheral device, a validation decision regarding validity of the operating firmware based on the validity of the received hash.

11. The management processor of claim 10, comprising a data source to provide the peripheral device with replacement firmware upon request by the peripheral device.

12. The management processor of claim 10, wherein determining the validity of the received hash comprises comparing the received hash against a set of accepted hashes.

13. The management processor of claim 10, wherein the validation decision indicates that the operating firmware is invalid if the received hash does not match at least one of a set of accepted hashes.

14. A method, comprising:
generating, by a peripheral device, a hash of operating firmware associated with the peripheral device;
transmitting the hash to a validator that is external to the peripheral device;
receiving, at the peripheral device, a validation decision from the validator, the validation decision being based on the transmitted hash; and
in response to the validation decision indicating invalidity of the operating firmware, executing recovery firmware on the peripheral device to cause the peripheral device to retrieve replacement firmware from a data source.

15. The method of claim 14, comprising validating, by the peripheral device, the retrieved replacement firmware.

16. The method of claim 14, comprising replacing, by the peripheral device, the operating firmware with the replacement firmware retrieved from the data source.

17. The method of claim 14, comprising updating, by the peripheral device, the operating firmware based on the replacement firmware retrieved from the data source.

18. The method of claim 14, wherein the validation decision indicates that the operating firmware is invalid if the transmitted hash is successfully validated by the validator.

19. The method of claim 14, wherein the validator comprises a management processor.

20. The method of claim 14, wherein the validator comprises the data source.

* * * * *